United States Patent [19]
Kanel

[11] Patent Number: 5,788,222
[45] Date of Patent: Aug. 4, 1998

[54] DEVICE FOR INSERTING A LINEAR ARRAY MODULE INTO LONG SMALL DIAMETER PRESSURE VESSELS

[75] Inventor: Amir Kanel, Palm Beach Gardens, Fla.

[73] Assignee: The United States of America as represented by the Secretary of the Navy, Washington, D.C.

[21] Appl. No.: 696,589

[22] Filed: Jul. 24, 1996

[51] Int. Cl.[6] ................................................ B65H 59/00
[52] U.S. Cl. ................................................ 254/134.3 FT
[58] Field of Search ................................ 254/134.3 FT, 254/134.3 R, 134.5

[56] References Cited

U.S. PATENT DOCUMENTS

| 4,337,922 | 7/1982 | Streiff et al. | 254/134.3 FT |
| 5,324,006 | 6/1994 | Pickrell | 254/134.3 FT |

*Primary Examiner*—Robert C. Watson
*Attorney, Agent, or Firm*—Michael J. McGowan; Michael F. Oglo; Prithvi C. Lall

[57] ABSTRACT

An apparatus for loading a linear array module into a pressure vessel includes a first rotatable winch positioned adjacent a first end of the pressure vessel, a second rotatable winch positioned adjacent a second end of the pressure vessel, a movable belt initially wrapped around the first rotatable winch, and a device for attaching the linear array module to the movable belt. First and second pulling members are attached between first and second ends of the linear array module and the first and second rotatable winches, respectively, and a device for selectively engaging and disengaging the first and second rotatable winches, according to a direction of movement of the movable belt through the pressure vessel is provided. Upon engagement of the second rotatable winch and disengagement of the first rotatable winch, the movable belt transportingly supports the linear array module into an interior of the pressure vessel, and upon engagement of the first rotatable winch and disengagement of the second rotatable winch, the movable belt transportingly supports the linear array during an extraction thereof from the interior of the pressure vessel.

11 Claims, 2 Drawing Sheets

DEVICE FOR INSERTING A LINEAR ARRAY MODULE INTO LONG SMALL DIAMETER PRESSURE VESSELS

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

(1) Field of the Invention

This invention generally relates to a method and device for inserting a linear array module into a long small diameter pressure vessel.

(2) Description of the Prior Art

Among the various types of U.S. Naval acoustic transducer equipment, is an item known as a towed linear array, which consists of a flexible tubular housing in which there are "strung-out" a multiplicity of individual acoustic transducers and individual potted electronic components. Each array is hundreds of feet in length, but for convenience in handling and servicing the total array is fabricated in connectible segments or modules. In a typical case (such as the SQR-19 towed array) the length of a module is forty (40) feet. Such modules are relatively heavy. For example at least four people are required to lift a 40 foot 5QR-19 module. Among personnel working with modules, the modules are sometimes referred to as "hose modules".

Existing towed line array repair facilities and towed line array manufacturers utilize long pressure vessels to test linear array modules in order to simulate underwater conditions. The pressure vessel inner diameter is typically one inch larger than a diameter of the linear array module (but sometime even larger). The pressure vessel is typically constructed of heavy steel or stainless steel flanged pipe sections, assembled from bolting together a few flanged sections.

Current operating procedures require three people to insert a linear array module into the pressure vessel, whereby one person feeds the linear array module from one end while the other two people pull on a rope which is fed through the pressure vessel tied to the end of the linear array module. While the linear array module is pulled through the pressure vessel, it is dragged on the bottom of the pipe of the pressure vessel, exposing it to any rough edges in the pressure vessel which can damage the exterior of the linear array module hose.

Known apparatuses and methods for inserting cables or the like into vessels include the following:

U.S. Pat. No. 952,545 to Persons discloses an apparatus for lining pipes with lead or similar material which includes inserting a lead tube of smaller diameter into a pipe and then expanding the lead tube until it is forced into close contact with the walls of the outer pipe. In this device, a cable is placed around the tube so that it lies within a groove of the tube and the cable is knotted so that after passing around the tube it may line the groove and extend in the direction of the end of the tube. The other end of the cable is led back through the inside of the tube and knotted, a block being interposed between the knot and the end of the tube as shown in FIGS. 1 and 4. The cable is of a length considerably greater than the tube and when its ends are attached to the tube, its middle portion forms a loop. In this loop, a pulley is journaled in a block, which block may in turn be attached to a suitable sheath or other means by which a retractive force may be applied to the block. By pulling on the block, the tension in the tube portions of the cable on opposite sides of the pulley would be equalized, and the result would be the application of an equal force simultaneously to both ends of the tube.

U.S. Pat. No. 1,949,298 to Fabel discloses a method of making heat insulating tape in which an end of asbestos material is inserted within a textile tube by tying an end of the asbestos material with a suitable traction element such as a heavy cord. The material is simply pulled into a tube from a support upon pulling of the traction element.

U.S. Pat. No. 2,750,151 to Fowler et al. discloses a guide for an electrician's snake which is detachably connected to the electrician's snake and includes a body which tapers adjacent opposite ends and is constricted intermediate its ends to facilitate its passage through a bent conduit. Antifriction elements carried by and extending outwardly from the body intermediate the ends thereof are engaged with the conduit during its passage therethrough and means carried by the body adjacent one end thereof detachably couples an electrician's snake thereto.

U.S. Pat. No. 4,003,122 to Overmyer et al. discloses an apparatus and method for applying a filter to a drainage tube. The filter sleeve is gathered and packed endwise on a tubular mandrel. The mandrel is received within a dispensing canister mounted on trench digging and drain laying equipment between a supply of drainage tubing and a trench plow and laying boat assembly. The drainage tube passes through the mandrel as it progresses from the supply to the laying boat which installs it in the trench, and one end of the filter sleeve is connected to the tubing whenever filter covering is desired. When so connected, the filter sleeve is continuously pulled by the tubing off the mandrel and about the tubing by a feed controller in the form of an annular diaphragm of the exit end of the mandrel.

U.S. Pat. No. 4,468,003 to Nonclercq et al. discloses a process for pulling cables into conduits consisting of locating a layer of balls on the surface of the conduit or cable before laying the conduit. The balls have a diameter which is much smaller than that of the cable and the balls may adhere to the cable as it progresses into the conduit by reason of, for instance, electrostatic forces. Alternatively, the balls may be blown into the conduit to form a carpet before the cable is forced into the tube. In either case, friction is reduced whatever the angular portion of the conduit which is contacted by the cable during pulling.

U.S. Pat. No. 4,518,152 to Pierce et al. discloses a device for loosening a cable within a conduit. Specifically, a cylindrical tubular sleeve member sized for fit within a conduit is utilized. This tubular sleeve member has a shaped mouth on at least one end for freeing a cable adhered to the inside of the conduit when the sleeve member is drawn longitudinally through the conduit with the cable passing through the inside sleeve space.

The above devices and methods are complicated in structure and tend to be difficult to use and are therefore substantially unacceptable in solving the problem of enabling one person to load a linear array module into a long, small diameter, pressure vessel.

SUMMARY OF THE INVENTION

Therefore, it is an object of this invention to provide a method and device for inserting a linear array module into a long, small diameter, pressure vessel which solves the problem found in the above prior art.

Another object of the present invention is to provide a movable belt member to which a linear array module is clamped. The movable belt is pulled through the inner diameter of the pressure vessel according to a load or unload condition of the device such that movement of the movable belt correspondingly moves the linear array module mounted thereon.

In accordance with one aspect of this invention, there is provided a method for loading a linear array module into a pressure vessel. The method includes steps of clamping one end of the linear array module to a movable belt, hooking a rope onto an end of the movable belt to which the one end of the linear array module is clamped, selecting a load operation with a selector switch, pressing a foot switch connected to the selector switch, disengaging a front winch having the movable belt initially wound therearound such that the front winch freely rotates, engaging a rear winch for winding the rope therearoundL, pulling the linear array module into the pressure vessel on the movable belt until an entirety of the linear array module is within the pressure vessel, and releasing the rope from opposing ends of the movable belt.

In an apparatus intended to carry out the method described above, there is provided a first rotatable winch positioned adjacent the first end of a pressure vessel, a second rotatable winch positioned adjacent a second end of the pressure vessel, and a movable belt initially wrapped around the first rotatable winch. Means are provided for attaching the linear array module to the movable belt, and first and second pulling members attached between first and second ends of the linear array module and the first and second rotatable winches, respectively. Means are provided for selectively engaging and disengaging the first and second rotatable winches, according to a direction of movement of a movable belt through the pressure vessel. Upon disengagement of the second rotatable winch and disengagement of the first rotatable winch, the movable belt transportingly supports the linear array module into an interior of the pressure vessel, and upon engagement of the first rotatable winch and disengagement of the second rotatable winch, the movable belt transportingly supports the linear array module during an extraction thereof from the interior of the pressure vessel.

BRIEF DESCRIPTION OF THE DRAWINGS

The appended claims particularly point out and distinctly claim the subject matter of this invention. The various objects, advantages and novel features of this invention will be more fully apparent from reading the following detailed description in conjunction with the accompanying drawings in which like reference numerals refer to like parts, and of which:

DESCRIPTION OF THE PREFERRED EMBODIMENT

Figure 1:
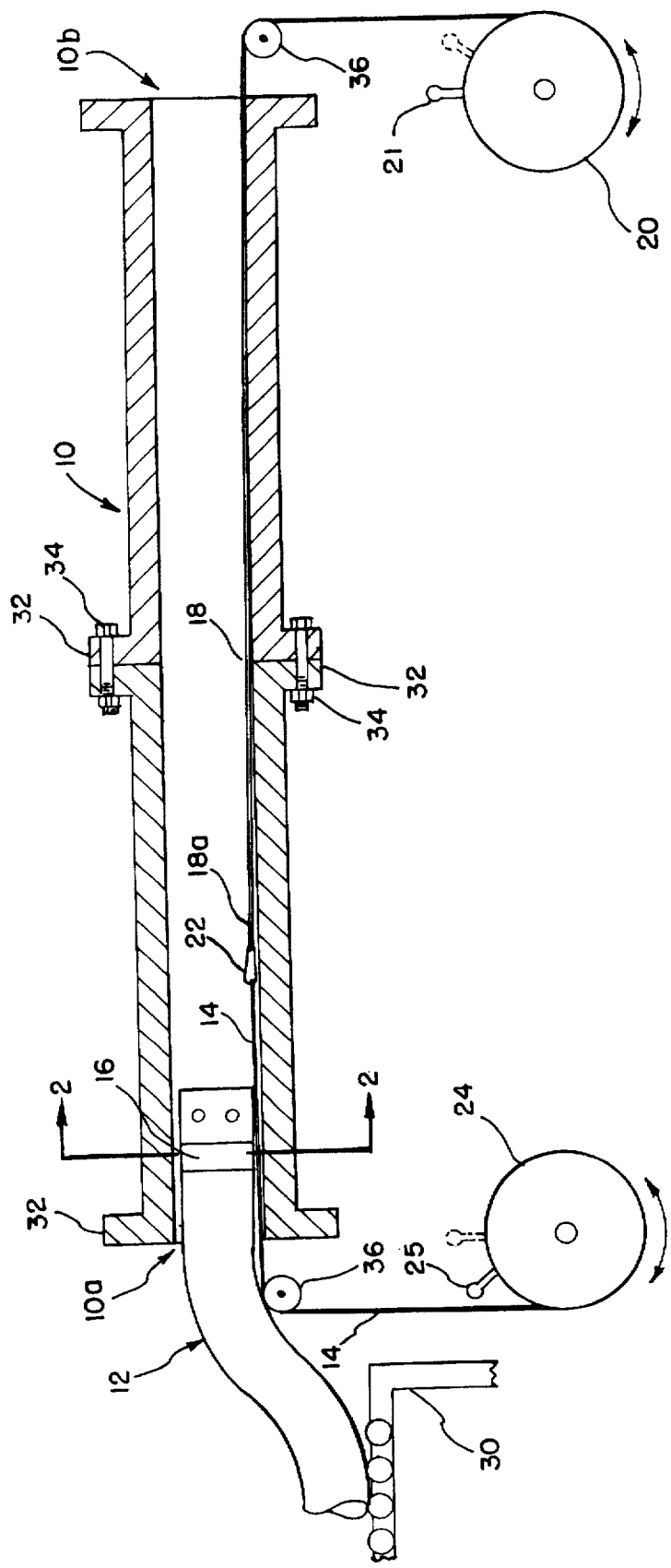
FIG. 1 is basically a central section, taken along line 1—1, FIG. 2, of the apparatus for loading a linear array module into a small diameter pressure vessel, certain components being omitted in the drawing.

FIG. 1 is a cross-sectional schematic view of an apparatus for enabling one person to load a linear array module into a long, small diameter, pressure vessel according to a preferred embodiment of the present invention.

As shown particularly in FIG. 1, the device includes a pressure vessel 10 having a first end 10a and a second end 10b. Generally, the pressure vessel is formed in sections each having end flanges 32 and the sections of the pressure vessel are connected together by joining together the flanges 32 with bolts 34 inserted through the flanges 32. This results in an elongated, small diameter pressure vessel.

A linear array module 12 is insertable within the pressure vessel 10 from a module cart 30 which initially supports the linear array module 12. A first end of the linear array module 12 is attached to a friction resistant belt 14 by means of a latched clamp 16 as shown in FIG. 1. The purpose of using a friction resistant material is to minimize damage to materials exposed to friction herewith. The friction resistant belt 14 is initially wound on a front winch 24, the winch including a lever 25 for placing the front winch 24 in either an engage or disengage position. In the engage position, the front winch 24 will apply a forceful counter-clockwise rotation to reel in the friction resistant belt 14 during an unloading operation of the towed line array module 12. In the disengage position, the front winch 24 freely rotates in a clockwise direction as shown by the arrow in FIG. 1 to allow the friction resistant belt 14 to be unwound from the front winch 24.

A pair of rollers 36 may be positioned at opposing ends of the pressure vessel 10 to facilitate the feeding of the friction resistant belt 14 and a pulling member 18, as for example a rope, onto respective winches. At the second end of the pressure vessel 10 is positioned a rear winch 20 which is also bi-directionally rotatable. A lever 21 is provided on the rear winch 20 for setting either an engage or disengage operation of the rear winch 20. When the lever 21 is in the engage position, the rear winch will rotate in a clockwise direction in order to reel the pulling member 18 onto the outer periphery of the rear winch 20. When the lever 21 is in a disengage position, the rear winch freely rotates in a counter-clockwise direction in order to facilitate unloading of the linear array module from the pressure vessel 10.

Figure 3:
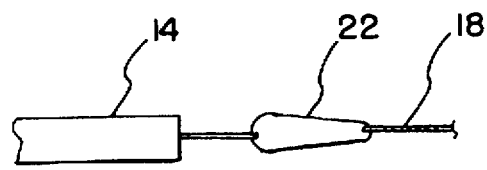
FIG. 3 is an enlarged top view of a portion of FIG. 1, taken in the direction of arrow 3, FIG. 1, illustrating a connection of a pulling rope to the movable belt via a hook.
Figure 4:
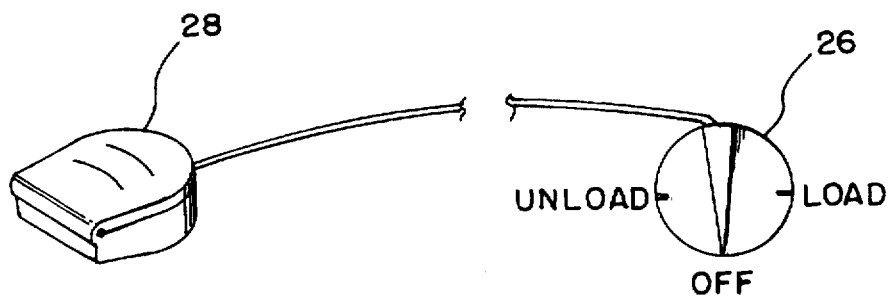
FIG. 4 diagrammatically illustrates the connection of a s elector to a foot switch for o perating a loading and unloading of the linear array module.

It will be understood that the friction resistant belt is connected to the pulling member 18 at both opposing ends thereof by means of a hook 22 as shown more clearly in FIG. 3. The pulling member 18 is shown primarily wound around rear winch 20, however both the pulling member 18 and the friction resistant belt 14 are wound around the front winch 24.

Figure 2:
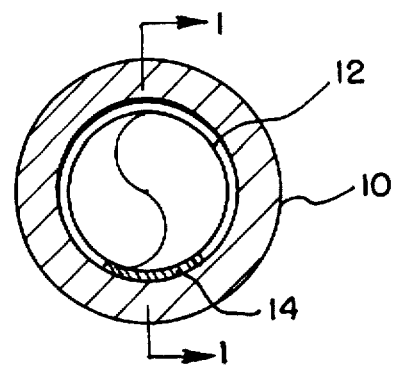
FIG. 2 is a cross section, taken along line 2—2, FIG. 1 of the linear array module on a movable belt within the pressure vessel (the central cavity of the module which contains individual transducer elements and potted electronic components being omitted in the drawing.

As shown in FIG. 2, upon insertion of the linear array module 12 into the pressure vessel 10, the linear array module 12 will be seated upon the friction resistant belt 14 in order to prevent contact of the linear array module 12 with the inner walls of the pressure vessel 10. The friction-resistant belt is flexible to conform in shape to an inner circumferential surface of the pressure vessel. Such an arrangement prevents frictional contact of the linear array module 12 with the inner walls of the pressure vessel, thus preventing scratching and damage to the linear array module 12.

In operation, the linear array module 12 is clamped on one end thereof to the friction resistant belt 14 by the latched clamp 16. The pulling member 18a is hooked to one end of the belt 14 which is attached to the rear winch 20 by a hook 22 (shown schematically). The other end of the belt 14 is hooked to a corresponding pulling member 18b (not shown) on the opposing end of the belt. The linear array module is then ready to be inserted into the pressure vessel.

The front winch 24 is disengaged to allow free clockwise rotation thereof. By switching the selector switch 26 to a load position and pressing a foot switch 28, the operator energizes the rear winch 20 which pulls the pulling member 18 and hence the belt 14 and linear array module 12 into the pressure vessel. The belt 14 absorbs all of the friction at the inner surface of the pressure vessel 10, and thus prevents friction between the linear array module 12 and the pressure vessel 10. Only one operator is required to perform the loading.

When the linear array module 12 is fully inserted into the pressure vessel, the rope 18 is disconnected from both ends of the belt 14. The length of the belt 14 is only a few inches shorter than the pressure vessel 10, and a few inches longer than the linear array module 12.

Upon complete insertion of the linear array module 12 within the pressure vessel 10, the pressure vessel doors (not shown) are closed allowing the operator to proceed with testing of the linear array module.

Unloading is performed in reverse by hooking the pulling members 18 from each winch 20 and 24 to the belt 14, disengaging the rear winch 20 for free travel and engaging the front winch 24 and selecting the unload position by means of the selector switch 26. The linear array module 12 slides out onto the linear array module cart 30 until it is completely removed from the pressure vessel 10. At this time, the latching clamp 16 is then removed from the linear array module.

The particular advantages of the method and apparatus described above include the fact that only one person is needed to insert the linear array module into a pressure vessel as opposed to three people necessary under a prior procedure.

Further, the friction between the linear array module and the pressure vessel is eliminated by the friction resistant belt when it is pulled inside the pressure vessel. This prevents the possibility of damage to the linear array module and the linear array coupling. The new procedure will utilize two winches, one to pull the linear array module inside the pressure vessel and the other winch to pull the linear array module out of the pressure vessel.

This invention has been disclosed in terms of certain embodiments. It will be apparent that many modifications can be made to the disclosed apparatus without departing from the invention. For example, in cases of relatively short, and sometimes smaller diameter linear array modules, satisfactory operation may be obtained with a single winch. Therefore, it is the intent of the appended claims to cover all such variations and modifications as come within the true spirit and scope of this invention.

What is claimed is:

1. An apparatus for loading a linear array module into a pressure vessel, comprising:

a first rotatable winch positioned adjacent a first end of said pressure vessel;

a second rotatable winch positioned adjacent a second end of said pressure vessel;

a movable belt initially wrapped around said first rotatable winch;

means for removably attaching only first and second opposing ends of said linear array module to said movable belt, a remainder of said linear array module resting on said movable belt;

first and second pulling members attached to the first and second ends of said movable belt, respectively; and means for selectively engaging and disengaging said first and second rotatable winches, according to a direction of movement of said movable belt through said pressure vessel, wherein upon engagement of said second rotatable winch and disengagement of said first rotatable winch, said movable belt transportingly supports said linear array module into an interior of said pressure vessel;

whereby upon engagement of said first rotatable winch and disengagement of said second rotatable winch, said movable belt transportingly supports said linear array during an extraction thereof from the interior of said pressure vessel.

2. The apparatus according to claim 1 further comprising means for selecting one of a loading or an unloading of said linear array module into or out of said pressure vessel, respectively.

3. The apparatus according to claim 1 wherein said means for attaching said linear array module to said movable belt is a latched clamp.

4. The apparatus according to claim 2 wherein said means for attaching said linear array module to said movable belt is a latched clamp.

5. The apparatus according to claim 1 wherein said means for selectively engaging and disengaging said first and second rotatable winches includes a selector switch connected to a foot switch, such that depression of said foot switch subsequent to positioning of said selector switch operates said first and second rotatable winches.

6. The apparatus according to claim 5 wherein selection of a "load" position on said selector switch will disengage said first rotatable winch and engage said second rotatable winch, thereby transferring said movable belt from said first rotatable winch toward said second rotatable winch, and selection of an "unload" position on said selector switch will engage said first rotatable winch and disengage said second rotatable winch, thereby winding said movable belt onto said first rotatable winch, and transporting said linear array module into and out of said pressure vessel corresponding to movement of said movable belt.

7. The apparatus according to claim 1 wherein said first and second pulling members are attached to first and second ends of said movable belt by corresponding hooks.

8. The apparatus according to claim 7 wherein said first and second pulling members are rope.

9. The apparatus according to claim 1 wherein said movable belt conforms in shape to an inner curvature of said pressure vessel, thereby preventing contact of the linear array module with an inner surface of said pressure vessel.

10. The apparatus according to claim 1 wherein said movable belt is a friction-resistant belt formed to be longer than said linear array module and shorter than said pressure vessel, said movable belt conforming in shape to an inner curvature of said pressure vessel, thereby preventing contact of said linear array module with an inner surface of said pressure vessel.

11. The apparatus according to claim 1 wherein each of said first and second pulling members are positioned between said linear array module and a corresponding one of said first and second rotatable winches.

* * * * *